United States Patent [19]

Bridges et al.

[11] Patent Number: 4,922,741
[45] Date of Patent: May 8, 1990

[54] STATOR COIL FORMER

[75] Inventors: Joseph W. Bridges, North Versailles; Homer W. Luzader, Plum Boro, both of Pa.; Chandrakant P. Amin, Winter Springs, Fla.

[73] Assignee: Westinghouse Electric Corp., Pittsburgh, Pa.

[21] Appl. No.: 152,289

[22] Filed: Feb. 4, 1988

[51] Int. Cl.⁵ ............................................. B21D 11/10
[52] U.S. Cl. ....................................... 72/306; 72/384; 72/371; 72/301; 29/596; 140/92.1
[58] Field of Search ................. 72/457, 476, 306, 384, 72/371, 301; 29/596, 598; 140/92.1

[56] References Cited

U.S. PATENT DOCUMENTS

| | | | |
|---|---|---|---|
| 616,519 | 12/1898 | Bassford, Jr. | 153/21 |
| 1,721,810 | 7/1929 | Carter | 72/403 |
| 3,951,183 | 4/1976 | Muller | 140/92.1 |
| 4,117,707 | 10/1978 | Kolesar et al. | 72/306 |
| 4,138,874 | 2/1979 | Kolesar et al. | 72/306 |
| 4,450,708 | 5/1984 | King | 72/481 |
| 4,739,643 | 4/1988 | Kuriyama et al. | 29/596 |

FOREIGN PATENT DOCUMENTS

| | | | |
|---|---|---|---|
| 2257170 | 8/1975 | France | |
| 0076603 | 6/1977 | Japan | 29/596 |
| 0132703 | 10/1979 | Japan | 29/596 |
| 135349 | 11/1986 | Japan | |
| 0692009 | 10/1979 | U.S.S.R. | 29/596 |

Primary Examiner—David Jones

[57] ABSTRACT

A stator coil former is separated into forming sections and block supports. The forming sections are preferably separated into three sections: a cell bend forming section, an involute forming section and a lead bend forming section. The cell and lead bend forming sections may be repeatedly used while the involute forming section is individually designed. The supports for the forming sections preferably include supporting the cell bend forming section on a platen which supports the center portion of the stator coil, a working table for directly supporting the involute forming section, and an auxiliary table, supported by the working table, for supporting the lead bend forming section.

4 Claims, 12 Drawing Sheets

STATOR COIL FORMER

BACKGROUND OF THE INVENTION

1. Field of the Invention

The present invention is related to stator coil formers and, more particularly, to stator coil formers used in the manufacturing of large electric generators such as those used in power plants.

2. Description of the Related Art

Electric generators used to produce electricity in power plants have stator coils formed by two "half coils". Each half coil may be as long as 36 feet in a large generator and there may be around 60 in a small generator to as many as 120 in a large generator. The stator coils typically have a rectangular cross-section which may be up to 0.8 cm (2 inches) in width and up to 2.4 cm (6 inches) in height and are formed by stacking small insulated copper strands of multiple sizes, as illustrated in FIG. 3.

Conventionally, the insulated strands are stacked next to each other. Resin impregnated DACRON insulation is inserted between and around the stacks of insulated strands and all except the last four to six feet at each end is cured (the insulation is melted and solidified) while kept straight. Then, the ends of the half coil are formed in a complex curve so that the lead ends can be joined with another half coil to form a complete coil during assembly of the generator.

A stator coil former like former 20 illustrated in FIG. 1 is conventionally used to form the complex curved shape of the ends of half coils. The cured center portion 22 of a half coil is secured at the far side of the former 20 and the end 24 is bent from the straight position 24a indicated by dashed lines to the position indicated by solid lines to conform to forming surfaces 26, 28 and 30. This results in a formed stator coil end 24b like that illustrated in FIG. 2.

The conventional stator coil end former 20 illustrated in FIG. 1 is constructed in the following manner. The forming surface 26 is a portion of a cone having dimensions which are known from the size of the generator. The path taken by the stator coil across the cone is determined by the dimensions of the generator and the distance between the half coils which are joined to form a single coil. This shape is defined as an involute on the inside surface 26 of a cone. The involute shape is used so that the spacing between adjacent stator coil ends 24 arrayed on the conical surface is uniform and minimum electrical distances are maintained. Engineering drawings are produced indicating the shape of the half coil.

Using the engineering drawings, patternmakers produce patterns for forming a portion of the cone from laminated blocks of hardwood as illustrated in FIG. 1. The wood is conventionally carved by hand in a shape determined from the engineering drawings. Next, a recess is hand-carved out of the conical surface and a brass liner 32 is inserted to prevent the wood from being damaged. Then, wood patterns of shelves 34 and 36 having surfaces 28 and 30, respectively, are hand-carved to fit at an appropriate location on the conic surface 26. Conventionally there are three to four shelves 34 secured next to each other. Fantails (not shown) are carved into the ends of the wood patterns to fit the shelves 34 in the proper alignment. From these wooden patterns of shelves 34 and 36, aluminum castings are made which are ground, filed and hand fit to the conic surface 26 of former 20. Holes are drilled through the shelf sections 34 and 36 and the brass liner 32 which is then threaded so the shelves 34 and 36 can be bolted down. Holes (not shown) are then drilled in the shelves 34 and 36 so that clamps, heating elements and temperature controlling devices (not shown) can be inserted during the forming and curing of the coil ends. The coil end 24 is then manually formed by pounding, prying and wedging into position and clamped in place while heating elements are inserted into the previously drilled holes and insulation inserted between the insulated strands and wrapped around the strands, is cured. After the insulation solidifies, the stator coil end 24b maintains the shape in which it was secured during curing.

The stator coils are inserted around a generator as top and bottom half coils, each of which have geometrically different front and rear end turns. Therefore, a minimum of four stator coil formers are required for each generator, one for the top and bottom half coils at each end of the generator. Lower rated generators have equally spaced coils and require conventional coil formers 20 capable of producing stator coil ends 24 of only one shape. In higher rated generators, there can be as many as six groups of coils with each group separated by a greater distance than the distance between the coils within a group. Thus, each of the half coils within a group has a slightly different length and the coil former 20 is modified to handle these varying lengths. As a result, the cost and time required to produce coil formers is significantly increased for higher rated generators.

SUMMARY OF THE INVENTION

An object of the present invention is to produce a stator coil former in fifteen percent of the time conventionally required.

Another object of the present invention is to produce stator coil formers from computer-generated data defining the shape of the stator coil.

A further object of the present invention is to provide a method for making stator coil formers which utilizes cell and lead bend forming sections that can be used to form differently shaped stator coils.

Yet another object of the present invention is to reduce the amount of material which must be removed while shaping the forming surfaces of a stator coil former.

The above objects are attained by providing a stator coil end forming device comprising at least one forming section having forming surfaces corresponding to a shape in which the stator coil is to be formed and a support structure for supporting the at least one forming section. Preferably, there are at least two, and most preferably three, forming sections each having a parting face corresponding to the parting face of an adjacent forming section. The at least two forming sections are aligned in the formed shape of the stator coil end by placing the parting faces flush against each other. The supporting structure preferably comprises separate section supports corresponding to each of the forming sections.

In a preferred embodiment of the present invention, the forming sections comprise a cell bend forming section, an involute forming section alignable with the cell bend forming section and a lead bend forming section alignable with the involute forming section. These forming sections are supported by bolting the cell bend forming section to an apparatus used for supporting the unformed stator coil, a working table for directly supporting the involute forming section in alignment with the cell bend forming section and an auxiliary table, supported by the working table, for directly supporting the lead bend forming section in alignment with the involute forming section.

A stator coil end forming device according to the present invention is preferably constructed by a method comprising the steps of defining a shape of a stator coil end as a set of data in three-dimensional space; creating, from the set of data, numerical control commands for cutting a workpiece to produce forming surfaces corresponding to the shape of the stator coil end; and cutting the workpiece using a numerical control machine controlled by the numerical control commands.

These objects, together with other objects and advantages which will be subsequently apparent, reside in the details of construction and operation as more fully hereinafter described and claimed, reference being had to the accompanying drawings forming a part hereof, wherein like reference numerals refers to like parts throughout.

DESCRIPTION OF THE PREFERRED EMBODIMENTS

It is common to use computer programs to aid in designing the shape of stator coil ends. Such programs have been in use in the industry since the 1950s or 1960s and typically produce a set of data representing points in three-dimensional space. The same calculations could be made by hand or taken from a set of drawings, particularly from drawings produced on a computer aided drafting system where the curvature and dimensions are provided.

Figure 1:
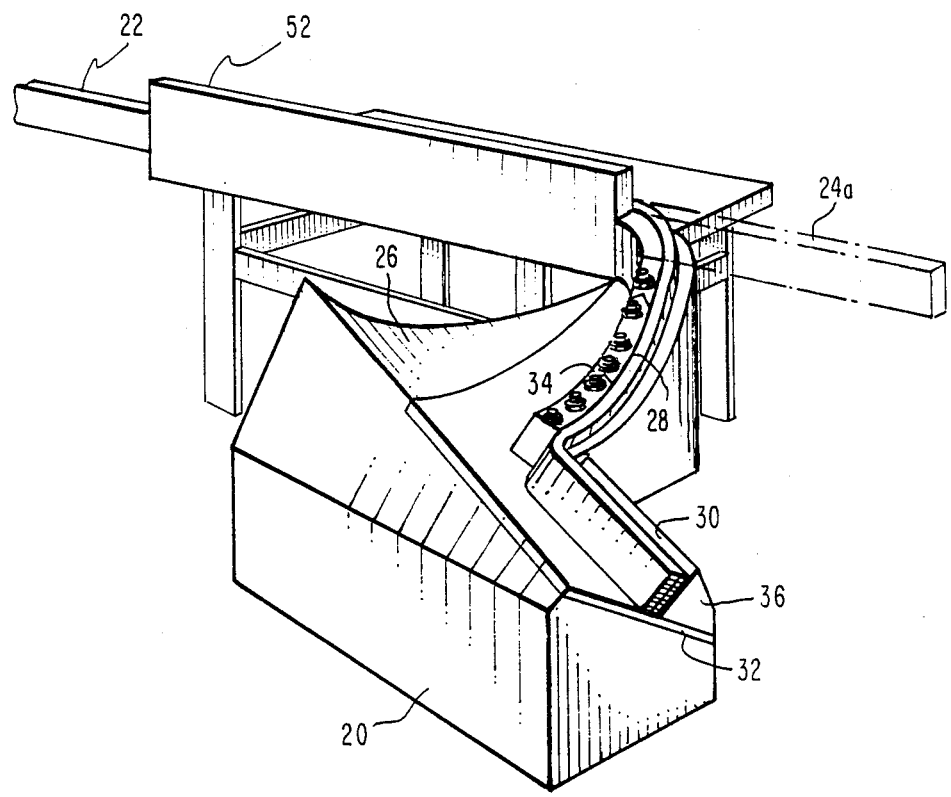
FIG. 1 is a perspective view of a conventional stator coil end former.
Figure 2:
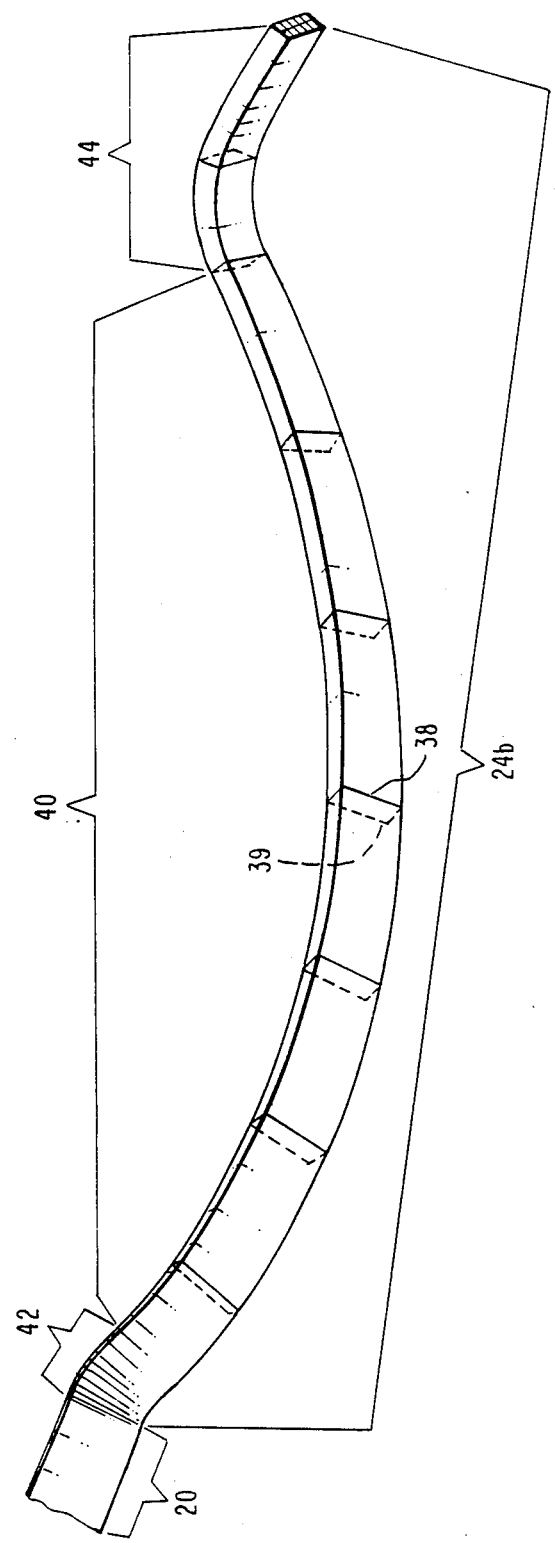
FIG. 2 is a perspective view of a stator coil end after being formed.

The set of data which is produced by one of the methods described above defines a stator coil end 24b as illustrated in FIG. 2. Twenty-six cross-sections are sufficient to define the shape of the stator coil end 24 regardless of its length. The cross-sections intersect the edges of the coil at four corners as best illustrated at cross-section 38 in the involute section 40. One of the four corners will lie along the intersection of the forming surfaces of the stator coil former. The points defined for these corners will be called "model points". The point 39 in the cross-section 38 is one of the model points. The first two to four model points lie along the straight center portion 20 of the stator coil. Model points 4–12 define the cell bend section 42, model points 12–18 define the involute section 40 and model points 18–26 define the lead bend section 44. Fewer points are required for the involute section 40 since it is following the surface of a cone and not bending quickly. Relatively larger numbers of model points are used in the cell bend 42 and lead bend 44 sections, because the curves are sharper and more complex. It would of course be possible to use evenly spaced model points, but there would be an unnecessarily large number of points in the involute section 40.

Figure 3:
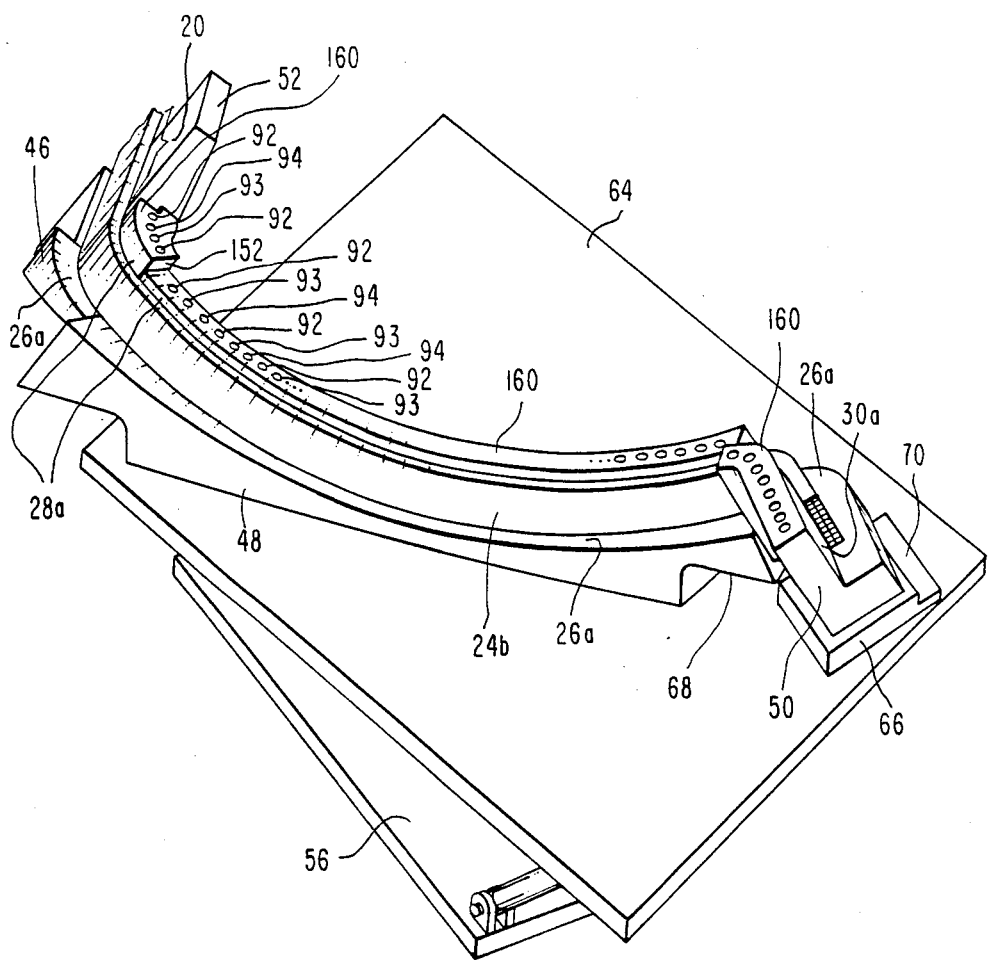
FIG. 3 is a perspective view of a stator coil end former according to the present invention.

This data is then used in the manner described later in more detail in machining one or more forming sections to produce forming surfaces corresponding to the shape in which the stator coil end is to be formed. It is desirable to have at least two and preferably three forming sections, as illustrated in FIG. 3. One of the forming sections is a cell bend forming section 46 and another is an involute forming section 48. Since these two sections are aligned to form continuous surfaces 26a and 28a, they could be formed as a single forming section, but it is desirable that at least a lead bend forming section 50 is separate, since only surface 28a is in common with the involute forming section 48. Forming surface 30a is on the opposite side of the stator coil end 24b.

There are several advantages to forming the cell bend forming section 46 separately from the involute forming section 48. First, the curvature of the cell bend forming section 46 is usually the same or very similar in many different generators. As a result, it is possible to use the same or very similar cell bend forming sections 46 with different involute forming sections 48 and lead bend forming sections 50.

Figure 4:
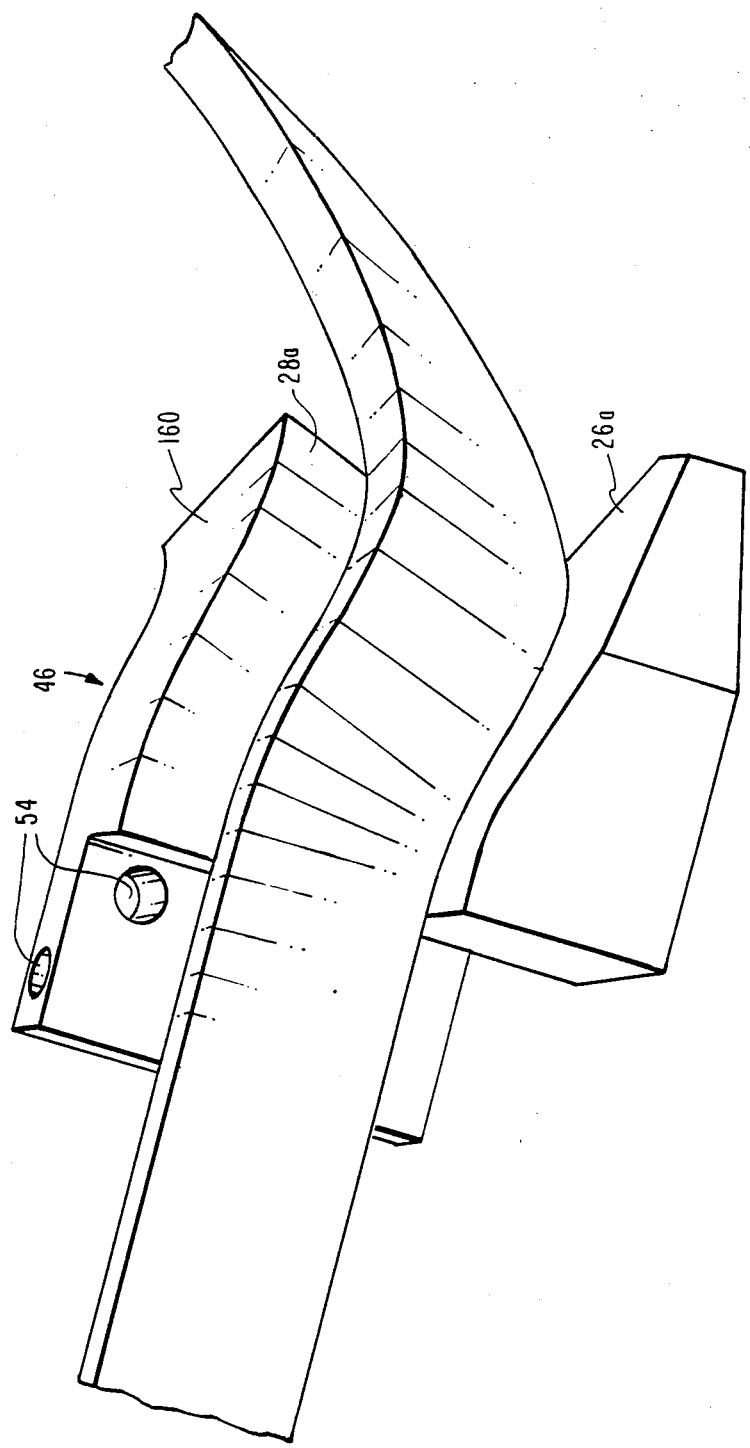
FIG. 4 is a perspective view of a cell bend forming section.

Second, it is preferable to have each of the forming sections 46, 48 and 50 supported by a separate section support to reduce the forces exerted on the section support supporting the involute forming section 48. The cell bend forming section 46 is attached to the stator coil center and cell bend forming section support 52. Conventionally, the center section 20 of the stator coil is supported on platens and it is only necessary to provide threaded holes in the platen for attaching the cell bend forming section 46. As illustrated in FIG. 4, through holes 54 are drilled in the cell bend forming section 46 for securing the cell bend forming section 46 to the platen 52 using holes (not shown) drilled in the platen 52 at appropriate locations to secure the cell bend forming section 46.

Figure 5:
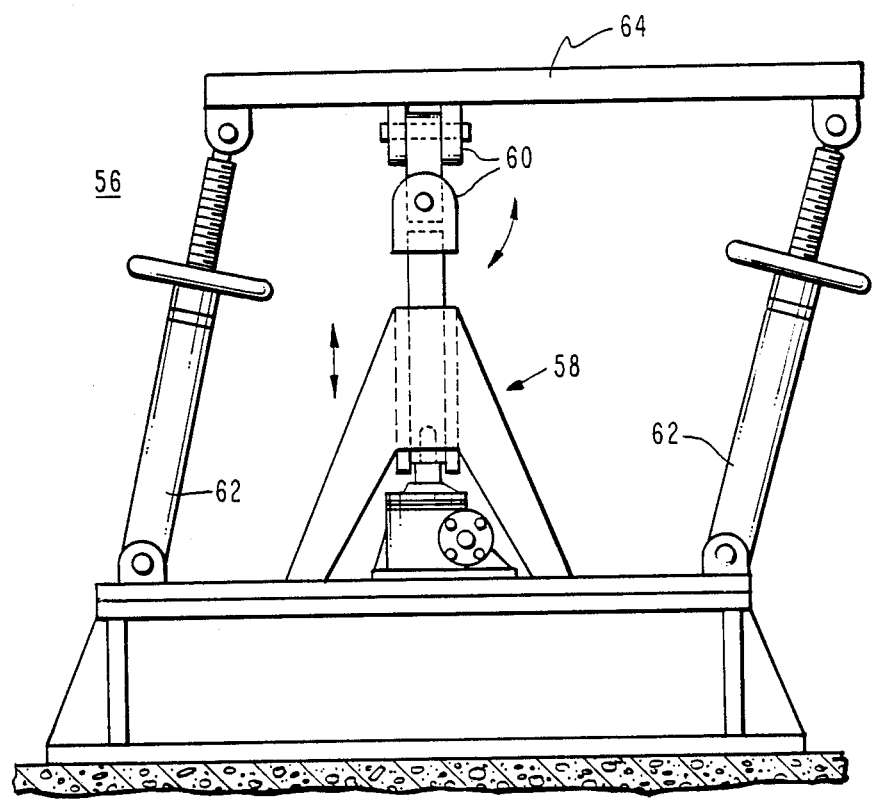
FIG. 5 is a perspective view of a working table.

The involute forming section 48 is preferably supported by a working table 56 which can tilt along two different axes and is able to withstand the forces required to bend the stator coil end 24, e.g., 1000 pounds. In other words, the working table 56 must provide a sturdy, adjustable support for the involute and lead bend forming sections 48, 50. One embodiment of such a working table is illustrated in FIG. 5 with a center support 58 having a universal joint 60 and lockable corner supports 62. Other configurations are also possible, provided adjustment is possible vertically and along two perpendicular axes of the table top 64.

The lead bend forming section 50 is preferably supported by an auxiliary table 66 which is illustrated in FIG. 3 as a wedge. A simple wedge shape is sufficient if, at all possible angles between the cell bend forming section 50 and the involute forming section 48, the auxiliary table 66 can be adjusted under a raised bottom end 68 of the involute forming section 48 to support the cell bend forming section 50. If the angles vary too much for a wedge shape, a small adjustable table could be used instead. In either case, means for securing the auxiliary table 66 to the working table 56 may be provided by, e.g., a bolt (not shown) slidably attached to the underside of the auxiliary table 66 which can be secured through openings (not shown) in the table top 64 of the working table 56. Any other means may also be used for securing the auxiliary table 66 in a position in which it directly supports the lead bend forming section 50 in alignment with the involute forming section 48.

Figure 6:
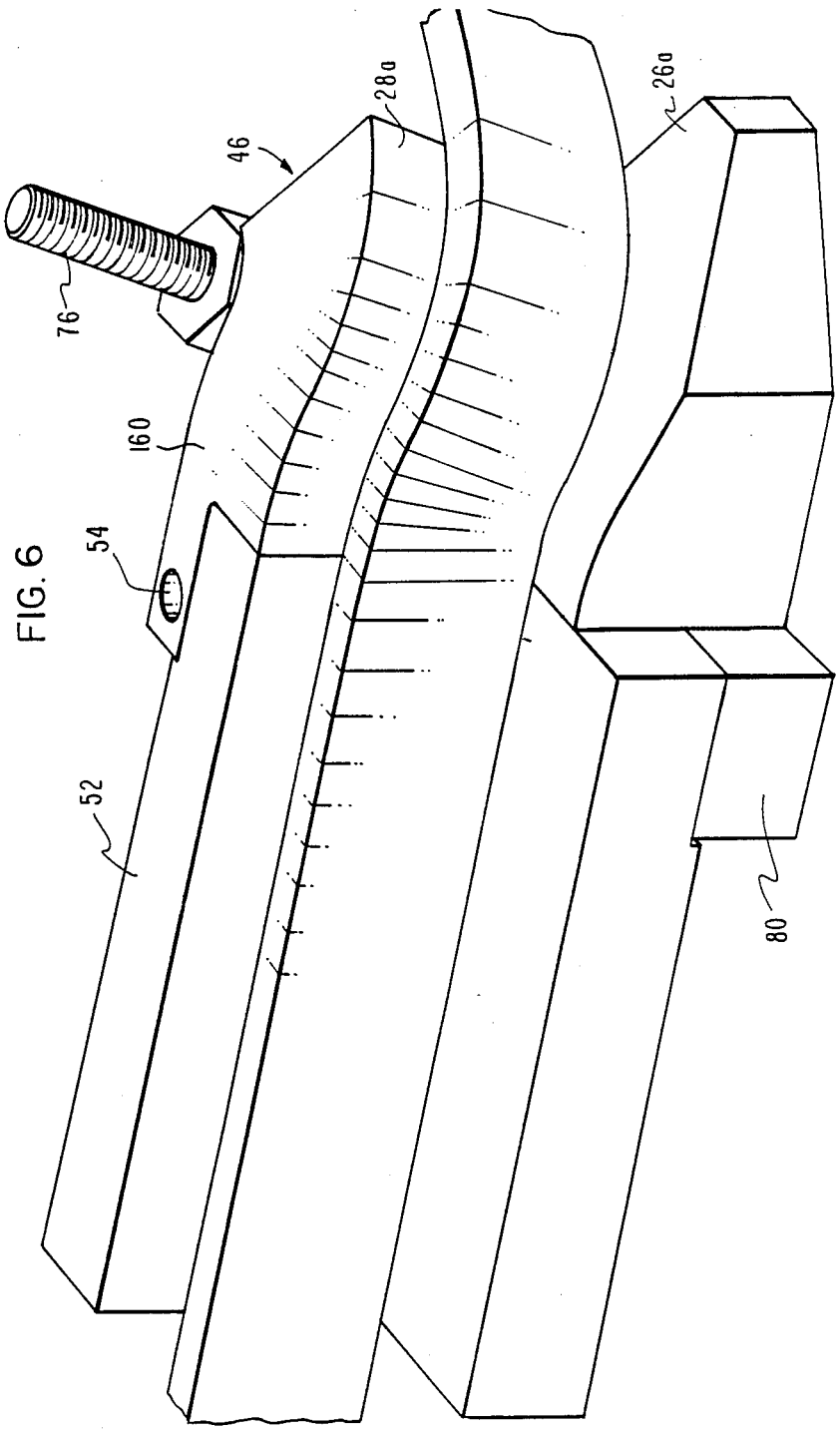
FIG. 6 is a perspective view of a cell bend forming section and a cell bend pin and pin adaptor.

To aid in bending the stator coil end 24 to conform to the shape of the forming surfaces 26a, 28a and 30a on the forming sections 46, 48 and 50, the preferred embodiment includes a cell bending pin 76 and a lead bending pin 78. These pins 76, 78 are used as fulcrums for a bending bar or hydraulic apparatus to produce a curve in the stator coil against the forming surfaces 28a and 30a. As illustrated in FIG. 6, the cell bending pin 76 is supported by a cell bending pin adapter 80 which is attachable to the cell bend forming section support (platen) 52 via bolt holes 82. The cell bending pin adapter 80 supports the cell bending pin 76 at the center of the primary arc of the cell bend forming section 46. In other words, the forming surface 28a on the cell bend forming section 46 includes an approximation of a cylinder having an axis substantially coincident with the axis of the cell bending pin 76. Thus, the cell bending pin 76 and adaptor 80 need only be changed when the radius of the curvature changes.

Figure 7:
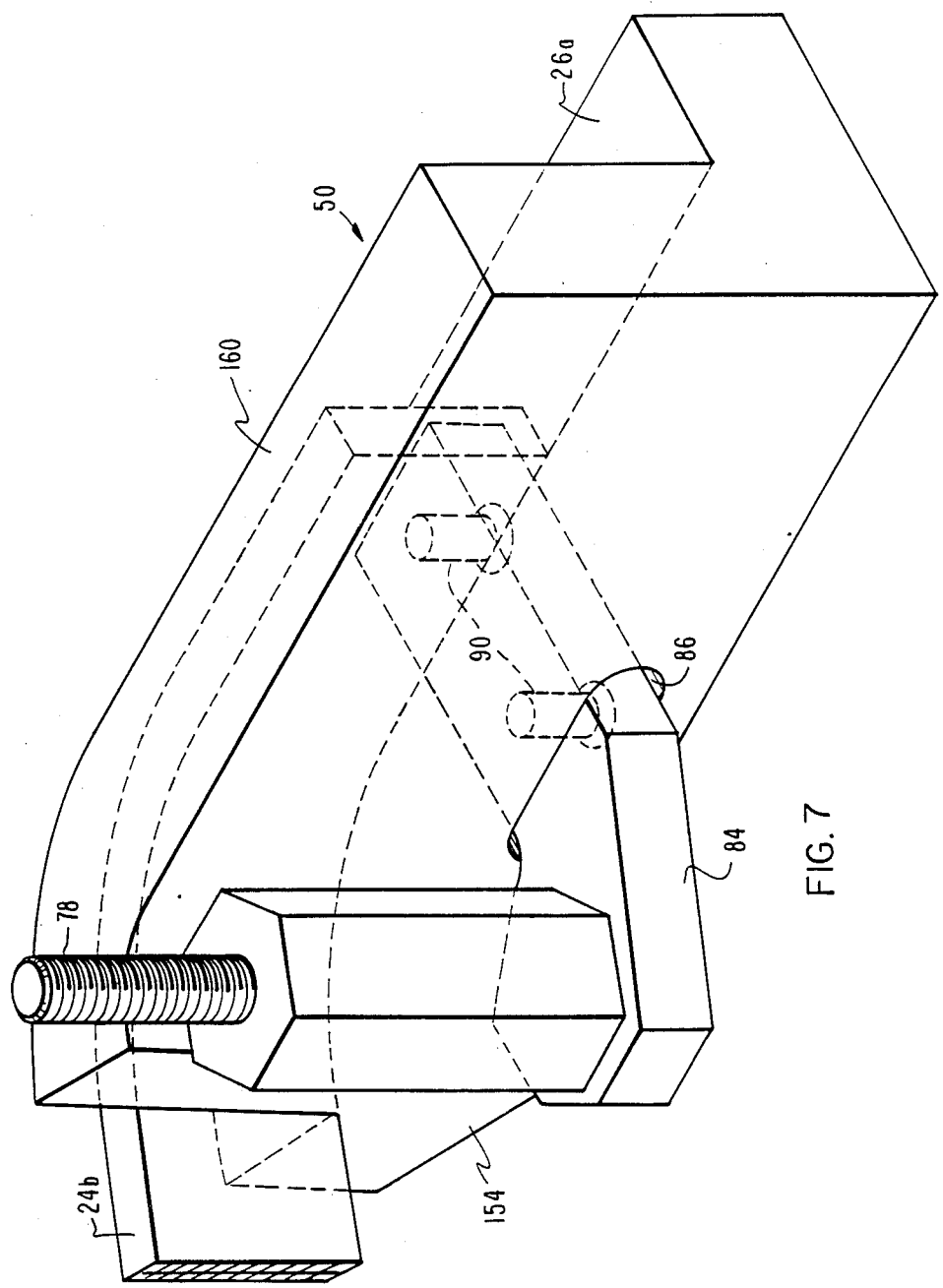
FIG. 7 is a perspective view of a lead bend forming section and a lead bend pin with adaptor.

To simplify the mounting of the lead bending pin 78, a lead bending pin adaptor 84 is provided for mounting the lead bending pin 78 indirectly on the working table 56 by attachment to the lead bend forming section 50. As illustrated in FIG. 7, the lead bending pin adaptor 84 is inserted in a slot 86 in the lead bend forming section 50 through an opening on the rear side 88 of the lead bend forming section 50. The slot 86 and bolt holes 90 in the lead bend forming section 50 are machined to properly position the lead bending pin adaptor 84 at the center of the primary arc in the forming surface 30a of the lead bend forming section 50. The lead bending pin adaptor 84 is individually machined to fit the slot 86 and holes 90 premachined in the lead bend forming section 50.

Like the shelves 34 and 36 used in the conventional stator coil former 20, holes 92-94 are drilled into sections 46, 48 and 50 as illustrated in FIG. 3. Holes 92 are used to attach rocker clamps (not shown) which hold the stator coil end 24b in place during curing. Preferably, the holes 92 are tapped to secure the clamps to the sections 46, 48 and 50. The remaining holes 93 and 94 are provided for inserting heating elements and temperature controlling elements for heating and controlling the curing of the stator coil insulation, respectively.

The preferred method for constructing the stator coil former described above is illustrated in FIG. 8. As described previously, conventionally an engineer specifies input parameters at step 100 to a stator coil involute program 102 to produce a data file 104 which defines the shape of at least four stator coil ends. The program also typically produces other outputs 105 including drawings, orders for materials, etc. As noted above, the data file 104 could be produced by other means, such as hand calculations or measurements from engineering drawings.

In the illustrated embodiment, the data file contains twenty-six model points along the intersection of the forming surface 26 with forming surfaces 28 and 30. Each model point has three coplanar points at the intersection of the other three edges of the stator coil with a plane perpendicular to the forming surfaces. This provides a total of 104 points which is sufficient to define the curvature of a stator coil end, but considerable processing (described in more detail below) is performed in step 106 to generate numerical control (NC) commands 108, e.g., APT source code, for machining the forming sections 46, 48 and 50.

Virtually all numerical control machines are available with a post processor 110 capable of compiling APT source code into, compiled NC commands 112. These commands are used in five axis NC machining 114 of preferably pre-machined parts 116 to produce twelve sections 117, three sections for each of the four differently shaped stator coil ends. In a case where some of the sections, such as the cell bend 46 and lead bend 50 sections have already been machined for use with a different involute forming section 48, only the involute sections 48 and any new cell 46 and lead bend 50 sections need to be machined.

Figure 8:
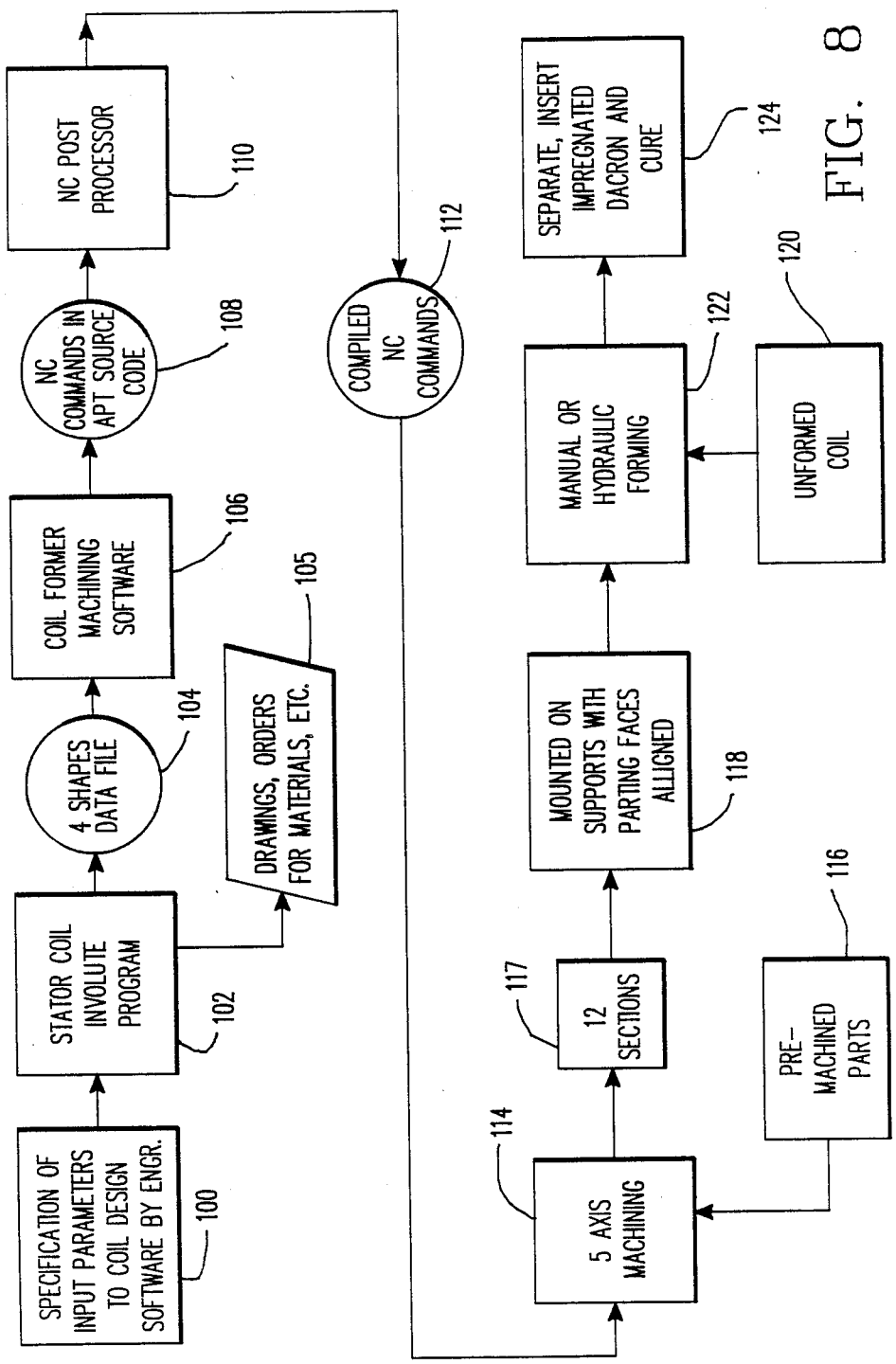
FIG. 8 is a flowchart of a method for constructing a stator coil former according to the present invention.

After the twelve sections 117 are machined or identified from among previously machined sections, three sections which will be used to form one of the stator coil ends are mounted on supports with the parting faces aligned in step 118. The supported forming sections are then aligned with an unformed stator coil 120. Preferably, the stator coil 120 is bellied, i.e., previously bent in an approximation of the involute forming section 48. The final steps 122 and 124 in FIG. 8 are the forming and curing of the stator coil.

Figure 9:
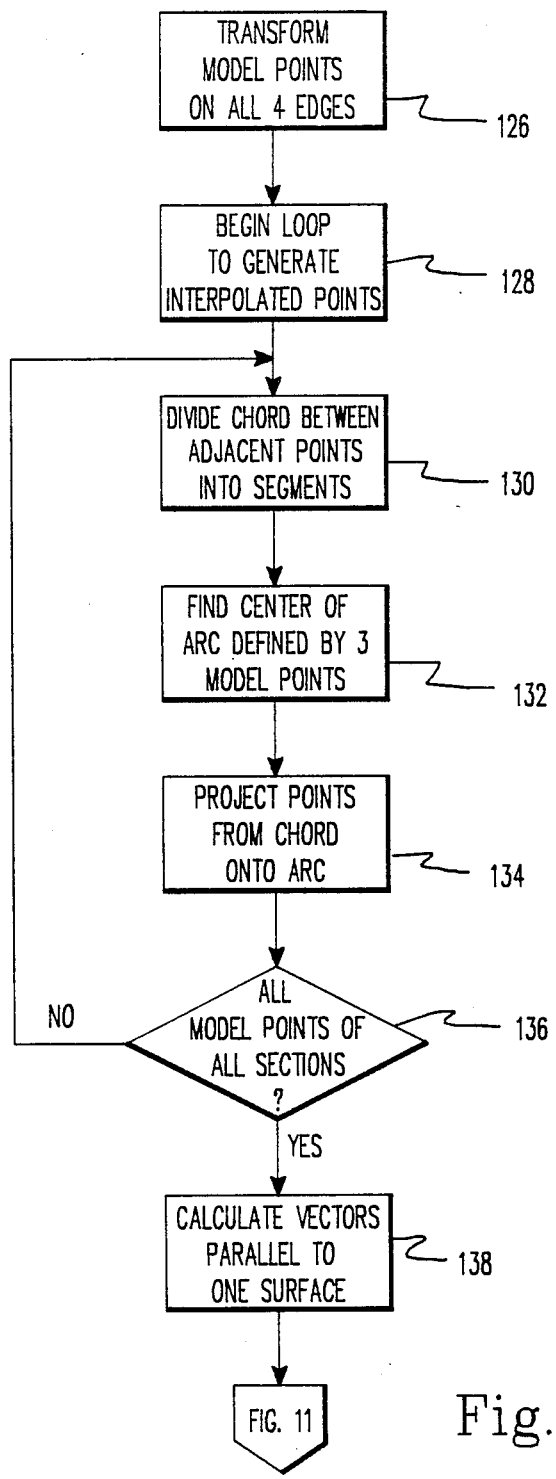
FIGS. 9 and 11 are flowcharts of a method for generating numerical control commands for machining a workpiece to produce forming section.
Figure 10:
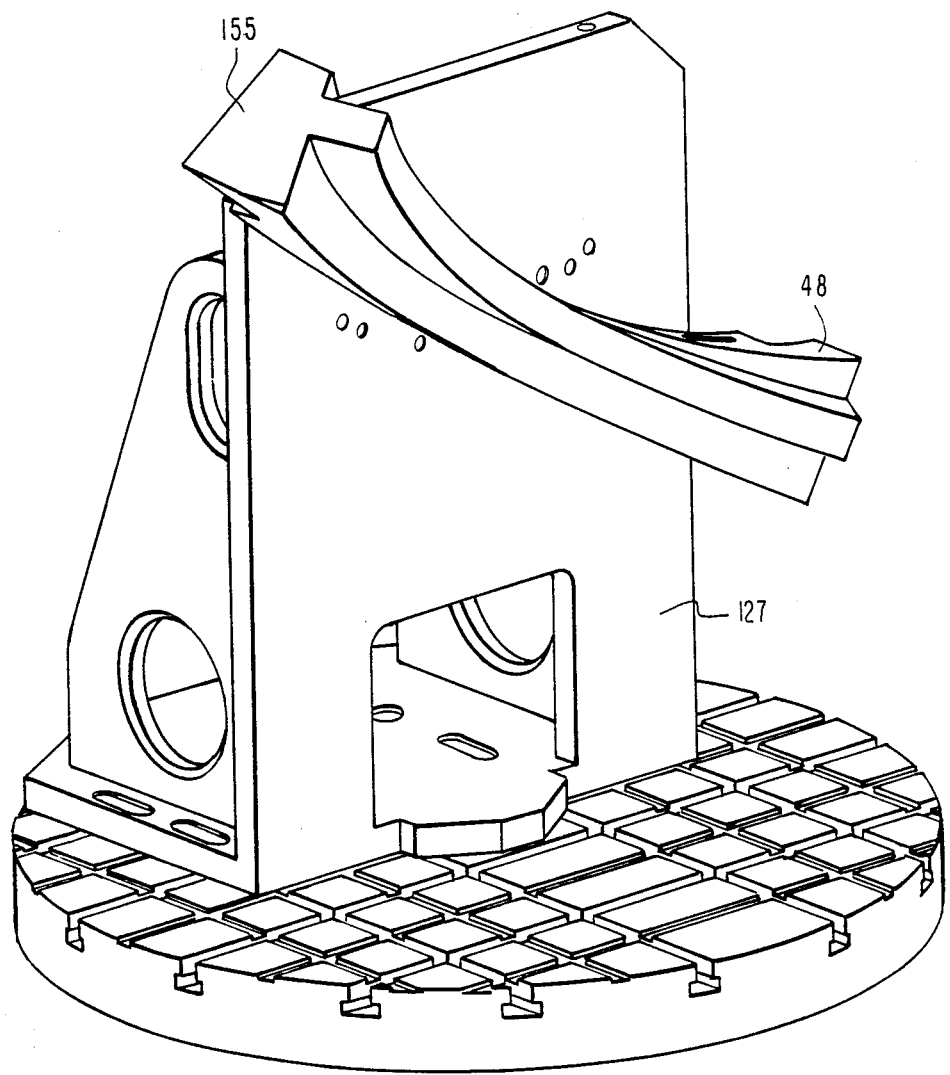
FIG. 10 is a perspective view of the involute forming section mounted for machining.
Figure 11:
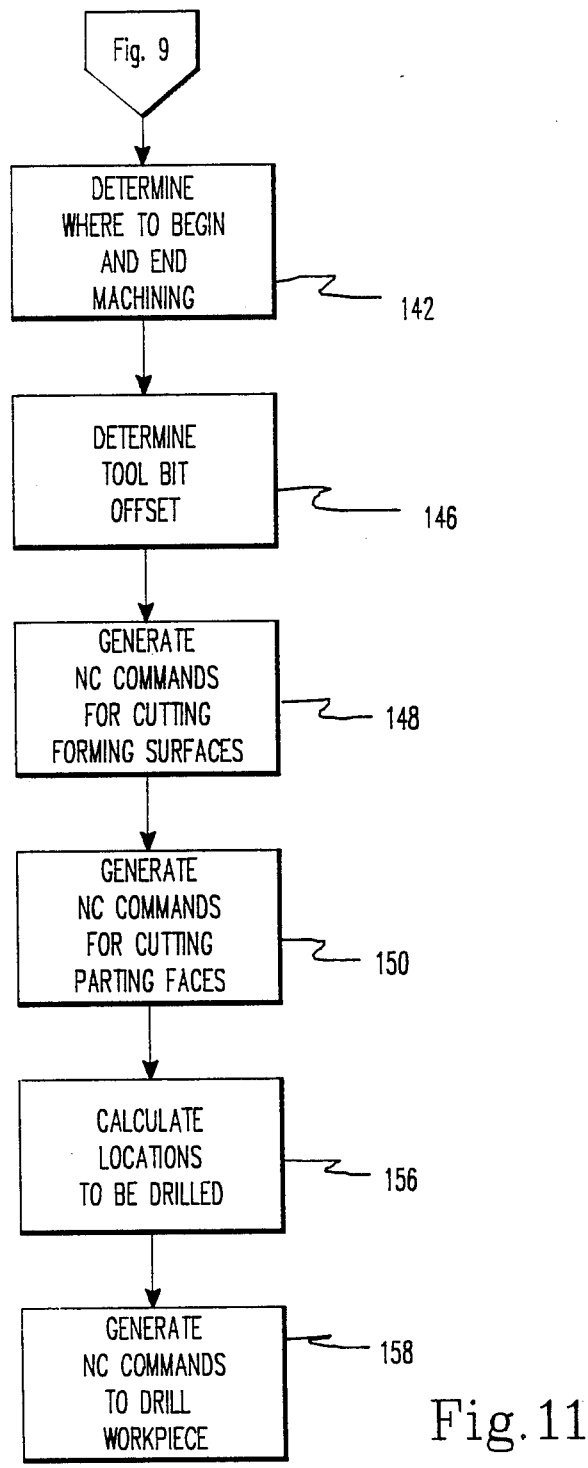

The details of the coil former machining software in step 106 of FIG. 8 will now be described with reference to FIGS. 9 and 11. The first step 126 is to orient the data along axes which are convenient for machining. While it would be possible to machine a single forming section using the original axes, when the forming section is separated into three sections as described above, it is preferable to manipulate the set of points to produce a transformed set of points oriented to a set of machining axes. The transformation and rotation of axes are known mathematical procedures which can be relatively easily applied to any set of three-dimensional points. The points corresponding to the cell bend 46, involute 48 and lead bend 50 sections are transformed separately so that each can be machined most efficiently. The involute forming section 48, for example, is preferably oriented along a diagonal on a machining fixture 127 as illustrated in FIG. 10. The cell 46 and lead 50 bend forming sections, on the other hand, are preferably offset from machining fixture 127 so that parting faces can be machined without interference by the machining fixture 127.

After the points defining a section have been transformed, additional points are created by interpolation (steps 128-136) along the edges connecting the points. Nearly all of the edges are arcs and known techniques can be used to generate the points between the points in the transformed set of data. In the preferred embodiment, the straight line distance (chord length) between adjacent model points is calculated and the chord is broken in step 130 into a number of segments each having a predetermined length. The predetermined length of the segments into which he cell bend 46 and lead bend 50 forming sections are divided is preferably one-fifth of the predetermined length of the segments in the involute forming section 48.

The center of an arc defined by three consecutive model points is calculated in step 132 and then the equally spaced points on the chord are projected onto the arc in step 134. This process is repeated for all four of the edges defining the surfaces of the stator coil which correspond to the forming surfaces of the forming section. However, the number of segments is preferably determined only once, e.g., along the edge (defined by the model points) at the intersection of the forming surfaces 28a and 26a, and equally spaced along the chords between the corresponding points on the other three edges. This process is repeated if the test step 136 indicates that not all of the points defining a forming surface section have been processed. Thus, points will be interpolated on arcs between model points 4 and 12 (straight lines are assumed between model points 3 and 4) along the four edges of the stator coil corresponding to the forming surfaces 26a and 28a on the cell bend forming section 46. In the case of the involute forming section 40 of the stator coil, the points are interpolated between model points 12 and 18 and for the lead bend forming section 50, points are interpolated between model points 18 and 26.

After the points have been defined for all three edges, vectors are calculated in step 138 for the interpolated points on the edges defining one of the forming surfaces, e.g., forming surface 26a for the cell bend and involute forming sections 46 and 48 or surface 30a for the lead bend forming section 50. This vector determines the orientation of a cutting tool bit 140 (FIG. 12) during machining so that it is always parallel to the surface which will be formed.

The interpolated points along the three edges define the surfaces as approximated by line segments connecting the points. Therefore, it is only necessary to generate a series of commands to move the cutting tool bit 140 in a straight line from point to point with the tool bit 140 oriented along the vector corresponding to those points and gradually move the tool bit 140 from just touching the surface at a point farthest from the intersecting edge 141 until the tool bit 140 is cutting along the intersecting edge 141. The procedure for accomplishing this task is known in the art and commercial programs exist for generating numerical control commands from a surface defined by points along four edges. One source for such programs is Computervision of Bedford, Mass. However, a general outline of the steps required is provided below with reference to FIG. 10.

Figure 12:
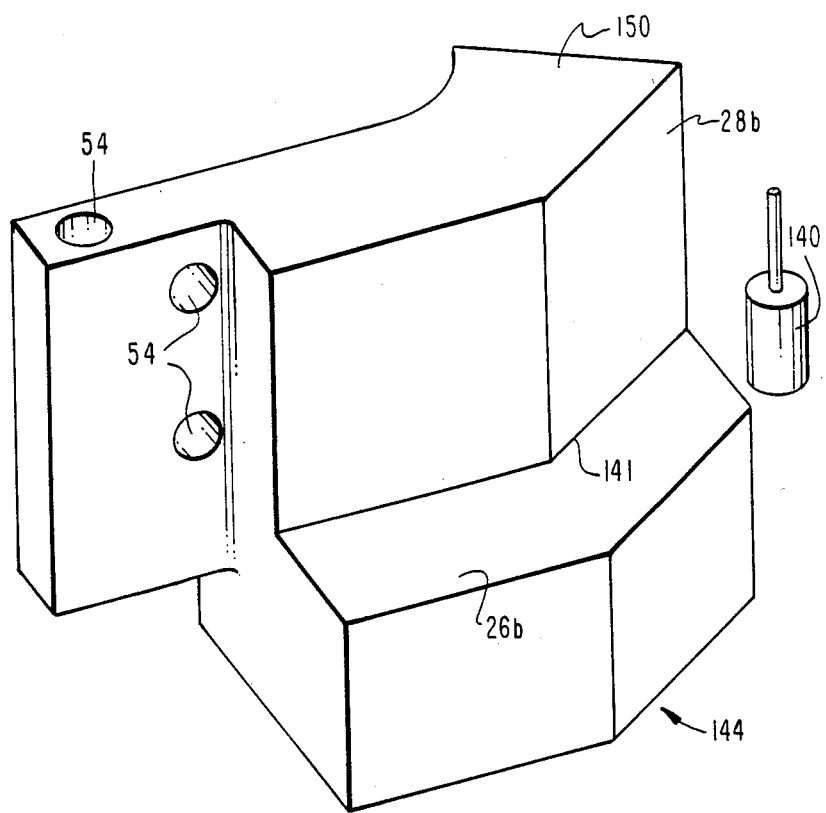
FIG. 12 is a perspective view of a pre-machined cell bend forming section.

First, it is necessary to determine where to begin and end machining in step 142. As indicated in block 116 of FIG. 8, the NC commands preferably control the machining of pre-machined parts. An example of a pre-machined cell bend forming section 144 is illustrated in FIG. 12. There is sufficient similarity between stator coil ends that a maximum of approximately 3.80 cm (1.500 inches) of surface 26b and 0.953 cm (0.375 inches) of surface 28b will typically be removed during machining to form surfaces 26a and 28a, respectively. Regardless of whether the forming surfaces are pre-machined or must be cut from a solid block, it is desirable to locate a position just off the block to which the tool bit 140 can be moved rapidly prior to beginning machining.

It is also necessary to offset the tool bit 140 by the distance from the outside edge of the bit 140 from a reference point in step 142. Typically, the reference point will lie along the axis of the reference and thus the radius of the bit 140 and any difference between the nose or tip of the bit 140 and the reference point must be taken into account, together with the direction from the reference point to the surface being machined. Once the information in steps 142 and 146 has been determined, the NC commands can be generated in step 148 for cutting a workpiece, such as the pre-machined forming section 144 in FIG. 12. Only a certain amount of material should be removed by each cut. Therefore, the commands generated for moving the tool bit 140 are offset in a direction parallel to the surface, e.g., surface 26b, which the nose of the tool bit 140 is in contact on each pass of the tool bit 140 along the path defined by the interpolated points on the edge 141 at the intersection of forming surfaces 26a and 28a. This gradually moves the tool bit 140 toward the surface 28b until the path being cut is approximately the same as the forming surface 28a. On some of the passes, the side of the tool bit 140 removes a portion of the surface 26b until a surface approximating the forming surface 26a has been cut. Then, finishing cuts are made in a manner known in the art of numerically controlled machining.

In the case of a relatively short bit, like bit 140 illustrated in FIG. 12, used to cut a pre-machined workpiece 144, it is preferable to begin cutting at the top surface 150 close to surface 28b. The tool bit 140 is gradually moved towards the surface 26b until it just misses the surface. Then, the beginning point is moved to a position like that illustrated in FIG. 12 near the outside edge of surface 26b to machine the surface 26b.

The next step provides the benefit of being able to use generic cell and lead bend forming sections 46 and 50 which were previously machined for a different involute forming section 48. The parting faces, i.e., face 152 of the cell bend forming section 46 in FIG. 3, face 154 of the lead bend forming section 50 in FIG. 7, face 155 of the involute forming section 48 in FIG. 10 and the face of the involute forming section 48 which is in contact with face 154 when the forming sections 46, 48 and 50 are assembled, are machined so that the individual forming sections 46, 48 and 50 will be properly aligned. This is accomplished by cutting the end face(s) of the workpiece, e.g., workpiece 144, in a manner similar to that described for the forming surfaces until the surface of the end face corresponds to the model and corresponding points, i.e., model point 12 or 18, between forming block sections.

The final steps in machining the workpiece are to calculate locations to be drilled (step 156) and generate in step 158 NC commands to drill the top surface 160 of the workpiece at these locations. There are three different types of holes: clamping holes 92, heating control holes 94 and heating holes 93. In the cell bend forming section 46, there may be only two clamping holes 92 and one each of the heating control 94 and heating holes 93. In the lead bend forming section 50, there may be four clamping holes and two each of the heating holes 94 and heating control holes 93. The number of holes in the involute forming section 48 depends upon the length of the section which can vary. The spacing between the holes in all three of the forming sections 46, 48 and 50 should be similar, as illustrated in FIG. 3.

The locations of the holes 92–94 are determined by offsetting the holes a predetermined distance from the surfaces 28a and 30a and generating a series of points along arcs from the model points in a manner similar to the interpolation of the edges of the coil described above. Then, the holes 92, 94 and 93 can be drilled in surface 160 at regular intervals as illustrated in FIG. 3.

This completes the generation of NC commands for machining one of the sections. The process is repeated for as many sections as are necessary to be machined. The NC commands for each section are stored in a separate file and supplied to the five-axis NC machine 114 for machining the pre-machined parts 116. The machined sections are then mounted on block supports 52, 56 and 66 so that the stator coil end 24 can be formed as described above.

By following the procedure described above for manufacturing a stator coil former, the premanufacturing phase of constructing a generator can be reduced from the typical amount of six weeks for conventional formers to one week using a method according to the present invention. In addition, reductions are possible in the manufacturing cycle because only a few extra hours are required to machine a second set of formers, even less if a second set of cell and lead bend forming sections 46, 50 are already available. This would allow two stator coils to be formed and cured at the same time. In addition, the surface forming block sections of the present invention have considerable less volume than a conventional former. This reduces the time required to heat and cool the stator coil end 24 during curing.

The many features and advantages of the present invention are apparent from the detailed specification and thus, it is intended by the appended claims to cover all such features and advantages of the device which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. An apparatus for shaping an unformed stator coil, comprising:
    a cell bend forming section having a parting face and forming surfaces corresponding to a shape in which the unformed stator coil is to be formed, one of the forming surfaces of said cell bend forming section having an arc of curvature with a center;
    an involute forming section having forming surfaces corresponding to the shape in which the unformed stator coil is to be formed and having parting faces for aligning said involute forming section with said cell bend forming section by placing corresponding parting faces thereof flush against each other; and
    a lead bend forming section having forming surfaces corresponding to the shape in which the unformed stator coil is to be formed and having a parting face for aligning said lead bend forming section with said involute forming section by placing corresponding parting faces thereof flush against each other;
    a platen for supporting said cell bend forming section and the unformed stator coil;
    a working table for directly supporting said involute forming section in alignment with said cell bend forming section;
    an auxiliary table, supported by said working table, for directly supporting said lead bend forming section in alignment with said involute forming section; and
    a cell bending pin mountable on said platen at the center of the arc on the one of the forming surfaces of said cell bend forming section.

2. An apparatus, for shaping an unformed stator coil, comprising:
    a cell bend forming section having a parting face and forming surfaces corresponding to a shape in which the unformed stator coil is to be formed;
    an involute forming section having forming surfaces corresponding to the shape in which the unformed stator coil is to be formed and having parting faces for aligning said involute forming section with said cell bend forming section by placing corresponding parting faces thereof flush against each other; and
    a lead bend forming section having forming surfaces corresponding to the shape in which the unformed stator coil is to be formed and having a parting face for aligning said lead bend forming section with said involute forming section by placing corresponding parting faces thereof flush against each other, said lead bend forming section having a primary arc of curvature with a center;
    a platen for supporting said cell bend forming section and the unformed stator coil;
    a working table for directly supporting said involute forming section in alignment with said cell bend forming section;
    an auxiliary table, supported by said working table, for directly supporting said lead bend forming section in alignment with said involute forming section; and
    a lead bending pin, mountable on said working table, having an axis intersecting the center of the primary arc of curvature of said lead bend forming section.

3. An apparatus as recited in claim 2, further comprising a lead bending pin adaptor attachable to said lead bend forming section for supporting the lead bending pin at the center of the primary arc of curvature of said lead bend forming section.

4. An apparatus for forming a stator coil end from an unformed stator coil having a longitudinal axis, comprising:
    a cell bend forming section having a parting face and having forming surfaces corresponding to a shape in which the stator coil end is to be formed, one of the forming services having an arc of curvature with a center;
    an involute forming section having forming surfaces corresponding to the shape in which the stator coil end is to be formed and first and second parting faces, the first parting face corresponding to the parting face of said cell bend forming section;
    a lead bend forming section having forming surfaces with a primary arc of curvature having a center and a parting face corresponding to the second parting face of said involute forming section;
    a platen for supporting said cell bend forming section and the unformed stator coil;
    a cell bending pin mountable on said platen at the center of the arc of curvature on the one of the forming surfaces of said cell bend forming section;
    a working table for directly supporting said involute forming section to maintain the first parting face of said involute forming section in face-to-face contact with the parting face of said cell bend forming section;

a lead bending pin, supportable by said working table, having an axis intersecting the center of the primary arc of curvature of said lead bend forming section; and an auxiliary table, supported by said working table, for directly supporting said lead bend forming section to maintain the parting face of said lead bend forming section in face-to-face contact with the parting face of said involute forming section.

* * * * *